(12) United States Patent
Buttolo et al.

(10) Patent No.: US 10,064,259 B2
(45) Date of Patent: Aug. 28, 2018

(54) ILLUMINATED VEHICLE BADGE

(71) Applicant: Ford Global Technologies, LLC, Dearborn, MI (US)

(72) Inventors: Pietro Buttolo, Dearborn Heights, MI (US); Stuart C. Salter, White Lake, MI (US); Paul Kenneth Dellock, Northville, MI (US); James J. Surman, Clinton Township, MI (US); James Stewart Rankin, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/151,543

(22) Filed: May 11, 2016

(65) Prior Publication Data

US 2017/0332463 A1 Nov. 16, 2017

(51) Int. Cl.
| | | |
|---|---|---|
| H05B 37/02 | (2006.01) |
| B60Q 1/26 | (2006.01) |
| B60Q 1/00 | (2006.01) |
| F21V 3/00 | (2015.01) |
| B60Q 3/80 | (2017.01) |

(52) U.S. Cl.
CPC ....... H05B 37/0281 (2013.01); B60Q 1/0088 (2013.01); B60Q 1/2619 (2013.01); B60Q 3/80 (2017.02); F21V 3/00 (2013.01)

(58) Field of Classification Search
CPC ..... F21V 3/00; H05B 37/0281; B60Q 1/0088; B60Q 1/2619; B60Q 3/0293
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |

(Continued)

FOREIGN PATENT DOCUMENTS

| | | |
|---|---|---|
| CN | 101337492 A | 1/2009 |
| CN | 201169230 Y | 2/2009 |

(Continued)

Primary Examiner — Dedei K Hammond
(74) Attorney, Agent, or Firm — Jason Rogers; Price Heneveld LLP

(57) ABSTRACT

A vehicle badge is provided herein. The badge includes one or more light sources configured to illuminate in a pseudo-random sequence. Each respective light source illuminates in a first illumination sequence defined by a first set of parameters and a subsequent second illumination sequence defined by a second set of parameters. A controller is operably coupled with the light sources and has a counter therein. The counter determines the subsequent illumination sequence while the first illumination sequence occurs.

12 Claims, 13 Drawing Sheets

(56) References Cited

U.S. PATENT DOCUMENTS

| | | |
|---|---|---|
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,825 B2 | 3/2006 | Callahan |
| 7,015,893 B2 | 3/2006 | Li et al. |
| 7,161,472 B2 | 1/2007 | Strumolo et al. |
| 7,178,941 B2 | 2/2007 | Roberge et al. |
| 7,202,607 B2 | 4/2007 | Kazar et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | La Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,330,383 B2 | 12/2012 | Man et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,721,121 B1 | 5/2014 | Briles |
| 8,724,054 B2 | 5/2014 | Jones |
| 8,754,426 B2 | 6/2014 | Marx et al. |
| 8,773,012 B2 | 7/2014 | Ryu et al. |
| 8,816,586 B2 | 8/2014 | Marcove et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,113,513 B1 | 8/2015 | Jungwirth |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0033676 A1* | 3/2002 | Harada .................... G09G 3/30 315/169.1 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2005/0275626 A1 | 12/2005 | Mueller et al. |
| 2006/0083015 A1* | 4/2006 | Yamazaki ............. B44C 5/0453 362/540 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2008/0211415 A1 | 9/2008 | Altamura |
| 2009/0015166 A1* | 1/2009 | Kwon .................... G01J 1/4204 315/156 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0084995 A1 | 4/2010 | Baaijens et al. |
| 2010/0102736 A1 | 4/2010 | Hessling |
| 2011/0012062 A1 | 1/2011 | Agrawal et al. |
| 2011/0068689 A1 | 3/2011 | Scenini et al. |
| 2011/0265360 A1* | 11/2011 | Podd ........................ G09F 9/33 40/541 |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0256543 A1* | 10/2012 | Marcove ............. B60Q 1/2607 315/77 |
| 2012/0280528 A1 | 11/2012 | Dellock et al. |
| 2013/0050979 A1 | 2/2013 | Van De Ven et al. |
| 2013/0088171 A1 | 4/2013 | Fensore |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0217921 A1 | 8/2014 | Yang et al. |
| 2014/0239848 A1 | 8/2014 | Bradford |
| 2014/0264396 A1 | 9/2014 | Lowenthal et al. |
| 2014/0266666 A1 | 9/2014 | Habibi |
| 2014/0293038 A1 | 10/2014 | Delmonico et al. |
| 2014/0300284 A1* | 10/2014 | Lee ...................... H05B 33/086 315/186 |
| 2014/0340886 A1 | 11/2014 | Deutsch |
| 2014/0373898 A1 | 12/2014 | Rogers et al. |
| 2015/0003047 A1* | 1/2015 | Lin ........................ F21V 31/005 362/103 |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0138809 A1 | 5/2015 | Salter et al. |
| 2015/0245438 A1 | 8/2015 | Tyrrell |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |

(56) References Cited

U.S. PATENT DOCUMENTS

2016/0131327 A1   5/2016  Moon et al.
2016/0236613 A1   8/2016  Trier
2017/0158125 A1   6/2017  Schuett et al.

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| EP | 2827250 A2 | 1/2015 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

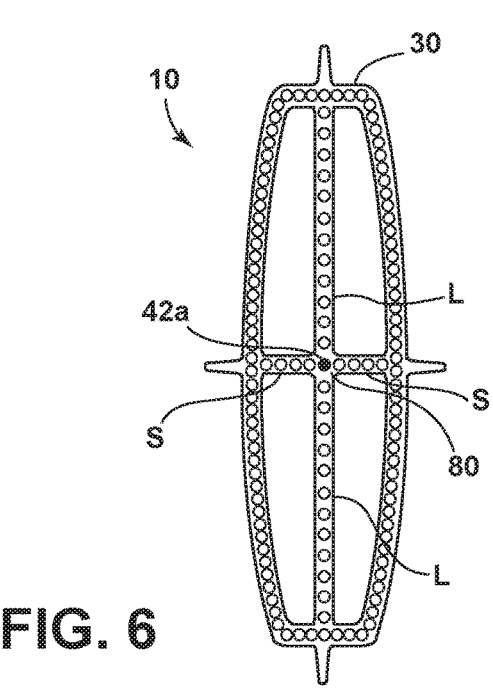 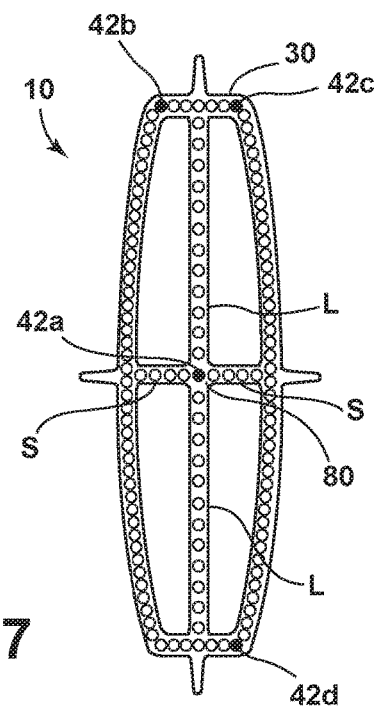
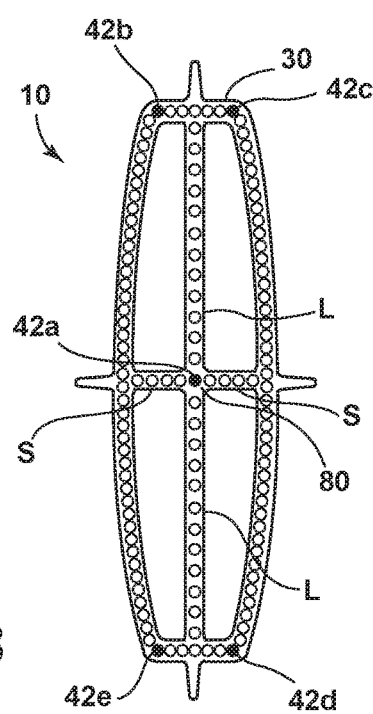

ILLUMINATED VEHICLE BADGE

FIELD OF THE DISCLOSURE

The present disclosure generally relates to vehicle badges, and more particularly, to vehicle badges operable to illuminate.

BACKGROUND OF THE DISCLOSURE

Some vehicle badges employ a number of light sources to effectuate a variety of lighting effects. As such, a need arises to improve the illumination of said badges.

SUMMARY OF THE DISCLOSURE

According to one aspect of the present disclosure, a vehicle badge is disclosed. The vehicle badge includes one or more light sources configured to illuminate in a pseudo-random sequence. Each respective light source illuminates in a first illumination sequence defined by a first set of parameters and a subsequent second illumination sequence defined by a second set of parameters. A controller is operably coupled with the one or more light sources and has a counter therein. The counter determines the subsequent illumination sequence while the first illumination sequence occurs.

According to another aspect of the present disclosure, a vehicle badge is disclosed. The vehicle badge includes one or more light sources configured to emit light through a viewable portion. A controller is configured to adjust an intensity of the emitted light from the one or more light sources. An electric current signal value is independently output to each of the one or more light sources and is configured to increase the intensity of emitted light from the one or more light sources in a linearly perceived illumination pattern.

According to yet another aspect of the present disclosure, a vehicle badge is disclosed. The vehicle badge includes one or more light sources configured to emit light through a viewable portion. A controller is configured to linearly adjust amongst varying color hues emitted from the one or more light sources. A decorative layer is disposed in front of the one or more light sources configured to control or modify an appearance of a viewable portion of the vehicle badge.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 6 is a first state of an exemplary illumination sequence that may be implemented by the badge;

FIG. 7 is a second state of an exemplary illumination sequence that may be implemented by the badge;

FIG. 8 is a third state of an exemplary illumination sequence that may be implemented by the badge;

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to an illuminated badge that may be attached to a vehicle. The badge is configured to illuminate in predefined sequences to further refine the viewing experience of the vehicle the badge is adhered to.

Figure 1:
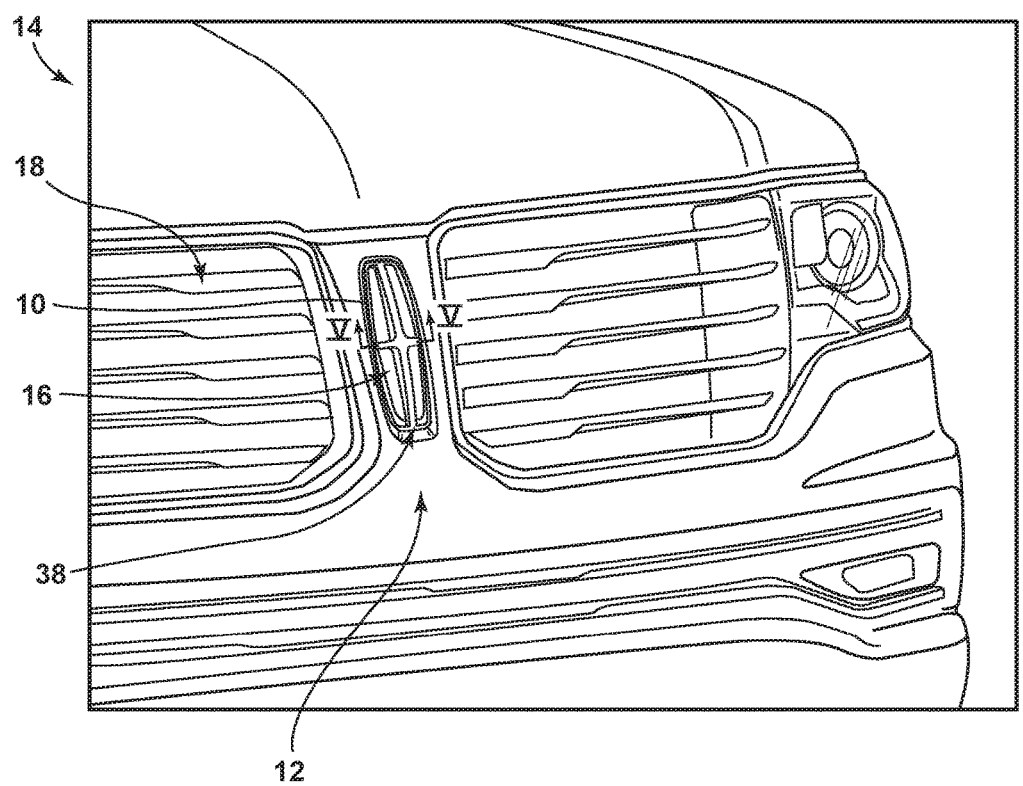
FIG. 1 is a front perspective view of a vehicle equipped with an illuminated badge on a grille assembly of a vehicle, according to one embodiment.

Referring now to FIG. 1, a badge 10 is generally shown mounted on a front portion 12 of a vehicle 14. In other embodiments, the badge 10 may be located elsewhere, such as, but not limited to, other locations of the front portion 12, a side portion, or a rear portion of the vehicle 14. Alternatively, the badge 10 may be disposed inside the vehicle 14. The badge 10 may be configured as an insignia that is presented as an identifying mark of a vehicle manufacturer and includes a viewable portion 16 that is generally prominently displayed on the vehicle 14.

In the presently illustrated embodiment, the badge 10 is centrally located on a grille assembly 18 of the vehicle 14, thus allowing the badge 10 to be readily viewed by an observer looking head-on at the vehicle 14. As will be described below in greater detail, one or more light sources may be disposed within the badge 10 and may illuminate portions of the viewable portion 16 to provide a distinct styling element to the vehicle 14.

Figure 2:
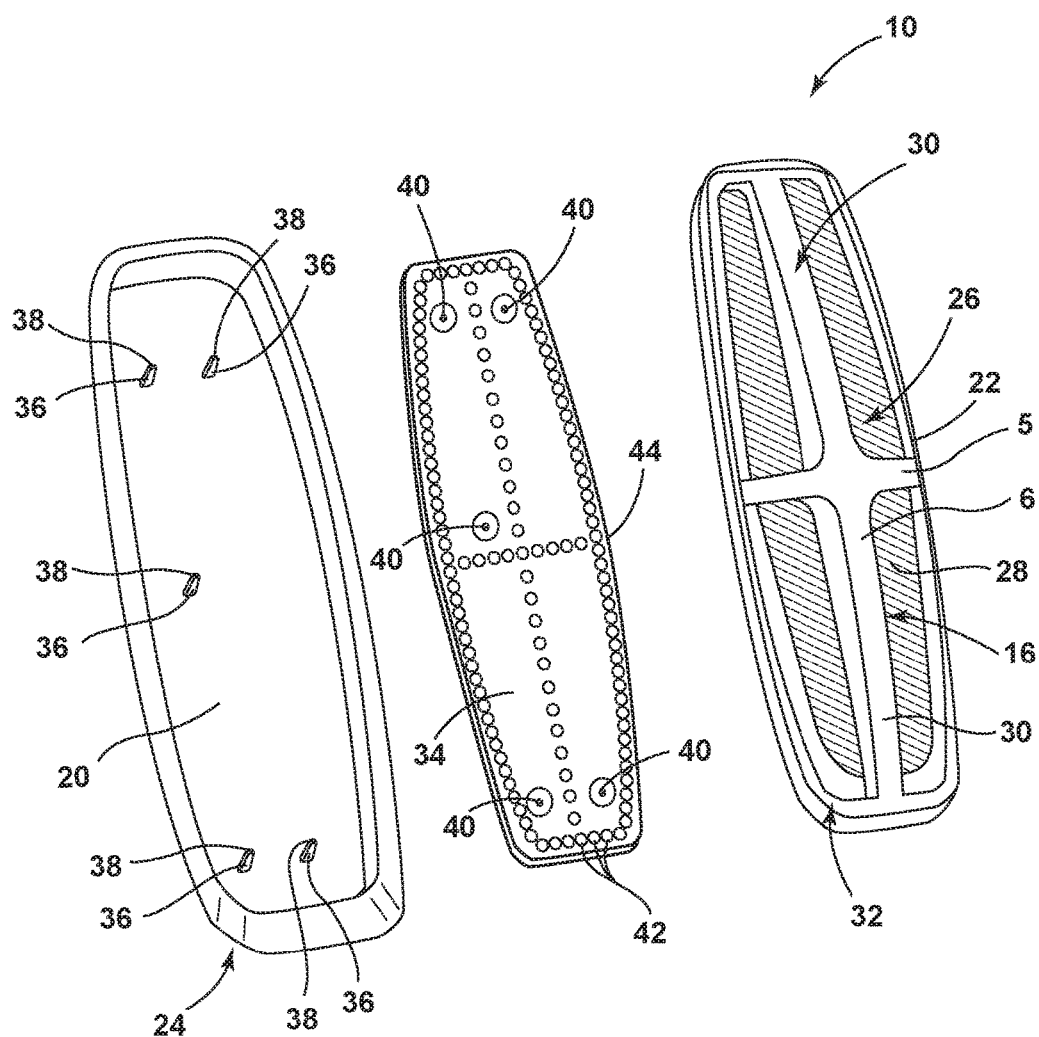
FIG. 2 is an exploded view of the badge, according to one embodiment.

Referring to FIG. 2, the badge 10 is shown, according to one embodiment, having a substrate 20 that may be attached to a housing 22. The substrate 20 may form a rear portion 24 of the badge 10 and may be capable of being secured to the vehicle 14 via any suitable means known in the art. The housing 22 may include the viewable portion 16 located on a forward portion 26 thereof. The viewable portion 16 may include a background region 28 and indicia 30. The indicia 30 may signify the make, model, or any other information that may be desirable to confer about the vehicle 14 upon which the badge 10 is attached to. The viewable portion 16 may include a transparent and/or translucent portion and one or more substantially opaque portion(s), which may be configured as opaque coatings applied to the viewable portion 16. In some embodiments, some, or all, of the viewable portion 16 may be left open to the front portion 12 of the vehicle 14. According to one embodiment, the background region 28 may be opaque or light blocking whereas the portion associated with the indicia 30 is light transmissive. As shown, the indicia 30 includes a rim portion 32 and a cross-portion defined by a long arm L and a short arm S.

According to one embodiment, the housing 22 and/or the substrate 20 may be constructed from a rigid material such as, but not limited to, a polymeric material and may be assembled to one another via sonic welding, laser welding, vibration welding, injection molding, or any other process known in the art. Alternatively, the housing 22 and the substrate 20 may be assembled together via the utilization of adhesives and/or fasteners. Alternatively still, the housing 22 and substrate 20 may be integrally formed as a single component.

With further reference to FIG. 2, a printed circuit board (PCB) 34 may be secured between the substrate 20 and housing 22. According to one embodiment, the substrate 20 includes a plurality of raised platforms 36. A fastener hole 38 is defined in each platform 36 and a plurality of corresponding through holes 40 is defined by the PCB 34. Accordingly, a plurality of complimentary mechanical fasteners (not shown) may be inserted through the through holes 40 of the PCB 34 and mechanically engaged to the fastener holes 38 for removably fixing the PCB 34 to the substrate 20.

Figure 3:
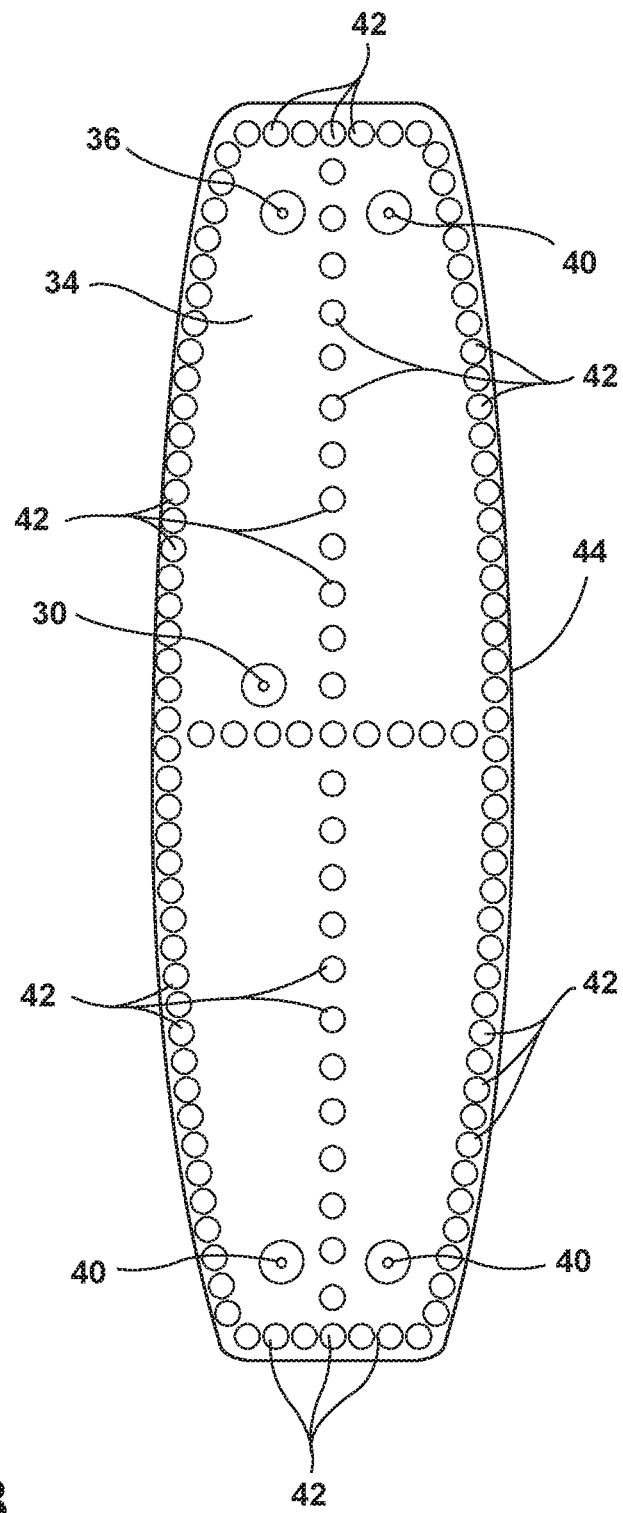
FIG. 3 is a front perspective view of a printed circuit board disposed within the badge having a plurality of light sources thereon, according to one embodiment.

Referring to FIGS. 2 and 3, the PCB 34 may have a plurality of light sources 42 disposed thereon in a variety of patterns. The light sources 42 may include any form of light source. For example, fluorescent lighting, light emitting diodes (LEDs), organic LEDs (OLEDs), polymer LEDs (PLEDs), solid-state lighting, or any other form of lighting configured to emit light may be utilized. In some embodiments, a reflective (e.g., white) solder mask may be applied to the PCB 34 to reflect light incident thereon. In the present embodiment, the light sources 42 are arranged to compliment the shape of the indicia 30 and are oriented to illuminate the indicia 30. Accordingly, a portion of the light sources 42 are spaced about a peripheral edge 44 of the PCB 34 to coincide with the rim portion 32 portion of the indicia 30 while another portion of the light sources 42 are spaced vertically and horizontally across the PCB 34 to coincide with the long arm L and the short arm S of the indicia 30, respectively. In operation, the light sources 42 may each be independently activated to emit light in a variety of colors at variable intensity. The light sources 42 may be activated concurrently or at different time intervals to exhibit different lighting effects.

Figure 4:
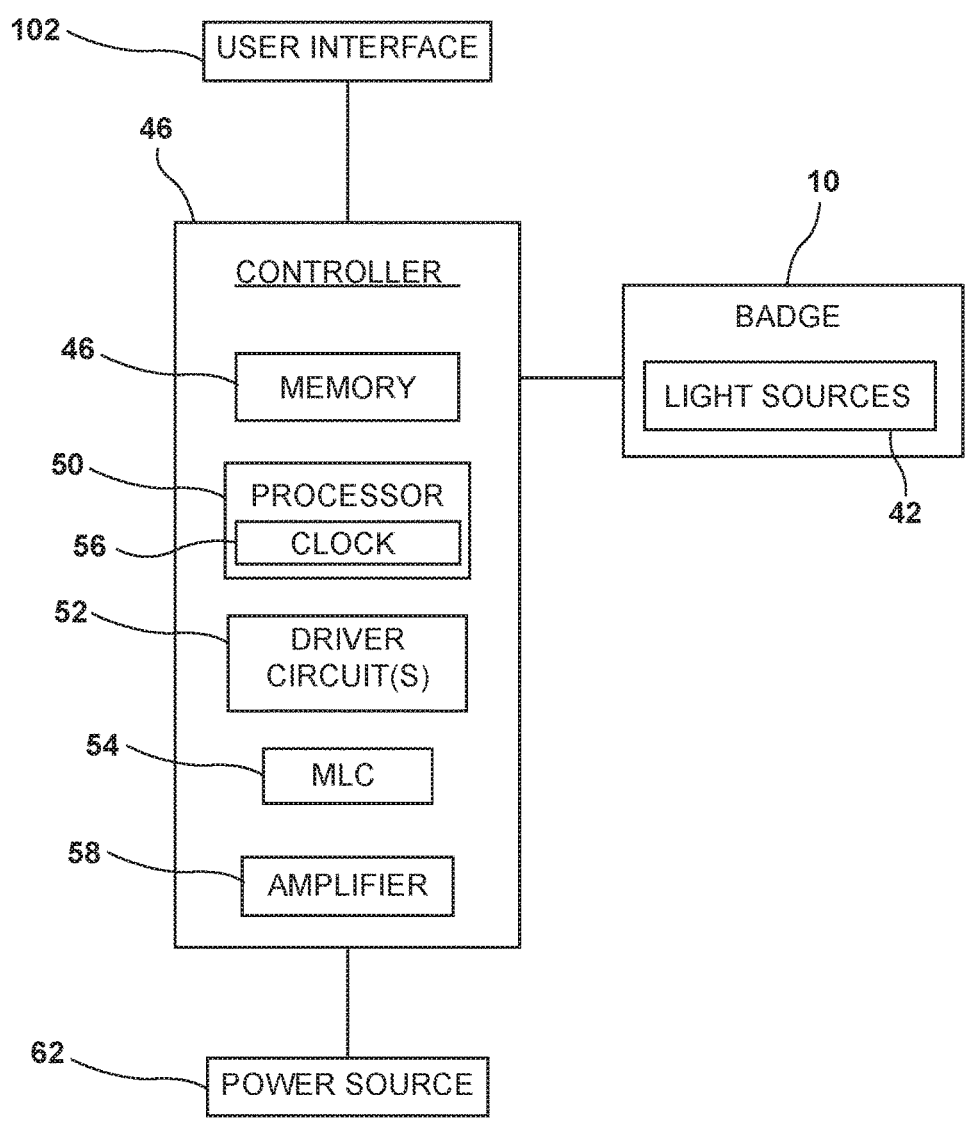
FIG. 4 is a schematic block diagram of the badge and the control arrangement configured to illuminate light sources disposed on the badge in a desired illumination sequence(s), according to one embodiment.

Referring to FIG. 4, a controller 46 is operably coupled to the badge 10 and is configured to independently control an activation state of each of the light sources 42. The controller 46 may be located on the PCB 34 or disposed elsewhere in the vehicle 14. The controller 46 includes a memory 48 having instructions stored therein that are executable by a processor 50 for controlling the light sources 42. The controller 46 may also include one or more driver circuits 52 operably coupled to the light sources 42. According to one embodiment, the controller 46 includes a master level controller (MLC) 54, which may be embodied as either a MOSFET or a transistor and is connected in series with each driver circuit 52. In operation, the MLC 54 may control the overall electric current signal values of the light sources 42 and provide for better resolution. For example, if using software implemented pulse width modulations to control the light intensity of the light sources 42, the pulse width modulations are generally limited by the rate of the clock 56 in the processor 50, or any other timer or counter disposed on the controller 46, which itself is limited by power consumption. In such a scenario, it is typical to achieve 50 equally spaced current levels and possibly 255 current levels in a best-case scenario. However, since the perception of light intensity is logarithmic, of the 50 current levels, for example, only the first few current levels will introduce a perceivable difference, thus resulting in poor resolution. By employing the MLC 54, square resolution is achievable. Accordingly, if 50 current levels were previously available via pulse width modulations, the inclusion of the MLC 54 would provide 2,500 current levels. As a result, one may achieve smaller increments at lower intensity levels and larger increments at higher intensity levels, thereby improving the resolution of the badge 10.

In an alternative embodiment, the MLC 54 is omitted in favor of an amplifier 58 disposed at the output of each driver circuit 52. The amplifier 58 may be exponential or logarithmic and enables the light sources 42 to exhibit increased ramp up at higher intensities and decreased ramp up at lower intensities to improve resolution.

The badge 10 may also include a user interface 102. The user interface 102 may be configured such that a user may control the light sources 42. The user interface 102 may be disposed within the vehicle cabin or on any surface that is accessible to the user during utilization of the badge 10. The user interface 102 may use any type of control known in the art for control the light source 42, such as, but not limited to, proximity sensors. The user interface 102 may be utilized to alter any lighting characteristic of the badge 10, any parameter of the badge 10, or the activation state of the badge 10. Additionally, the user interface 102 may be used to define lighting sequences or the colors of emitted light that are emitted from the light sources 42. It should be appreciated, however, that the user interface 102 may control any other feature of the badge 10 without departing from the teachings provided herein.

Figure 5:
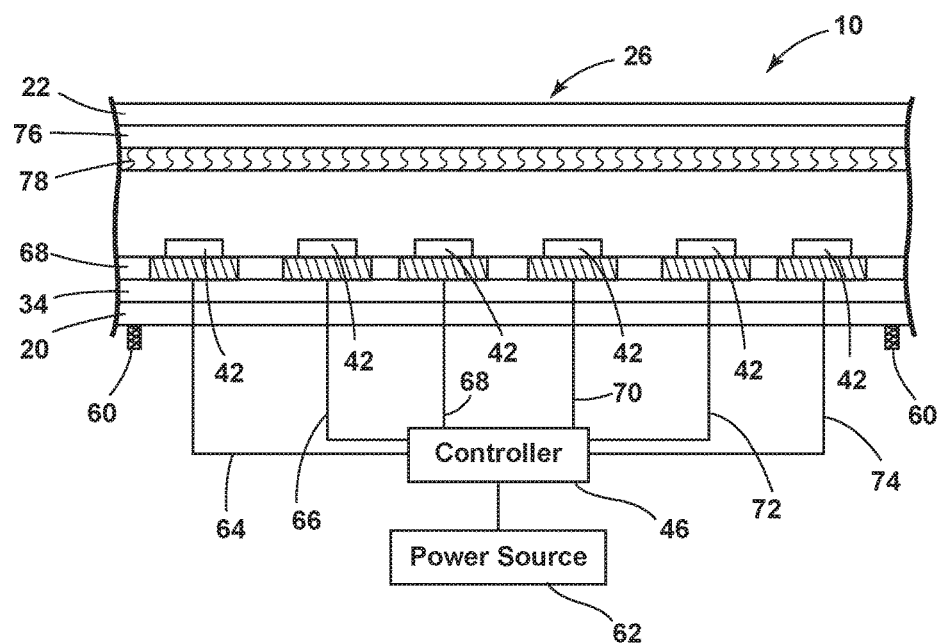
FIG. 5 is a cross-sectional view taken along the line V-V of FIG. 1 illustrating the badge, according to an alternate embodiment, having a plurality of independently illuminable light sources disposed rearwardly of a viewable portion, according to one embodiment.

Referring to FIG. 5, the badge 10 includes the housing 22 having the viewable portion 16, as described above, and the substrate 20 that is capable of being secured to a vehicle 14 through attachment points 60. Any practicable means may be used for attaching the badge 10 to the vehicle 14 including any known process for mounting the badge 10 onto a vehicle 14, or integrally forming portions of the badge 10 (e.g., the substrate 20) with additional vehicle components, such as portions of the grille assembly 18. The viewable portion 16 may illuminate in one or more predefined patterns.

As illustrated in FIG. 5, each light source 42 is each independently and electrically connected to the controller 46 and a power source 62 via electrical leads 64, 66, 68, 70, 72, 74. However, in alternate embodiments, each light source 42 may be connected in series, in parallel, and/or any combination thereof without departing from the teachings provided herein. As described above, the illumination of each light source 42 may be offset from any other light source 42 within the badge 10 to create various predefined lighting patterns. The lighting patterns may be predefined when the badge 10 is assembled, or may be later flashed to the controller 46 within the vehicle 14 and/or the badge 10 to add additional lighting patterns to the badge 10 at any time after installing the badge 10 on the desired surface.

The badge 10 may include a decorative layer 76 that is disposed between the light sources 42 and the viewable portion 16. However, the decorative layer 76 may be disposed in any other location within the badge 10 in alternate embodiments. The decorative layer 76 may include any suitable material that is configured to control or modify an appearance of the viewable portion 16. For example, the decorative layer 76 may be configured to confer a metallic appearance to the viewable portion 16. The metallic appearance can be disposed rearwardly of, or on any surface of, the housing 22 through any method known in the art, including, but not limited to, sputter deposition, vacuum deposition (vacuum evaporation coating), electroplating, or directly printing onto the housing 22. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. The decorative layer 76 or some portion thereof may be transparent and/or translucent to allow light to pass therethrough from an inner surface to an outer surface.

In other embodiments, the decorative layer 76 may be tinted any color to complement the vehicle structure on which the badge 10 is to be received. In any event, the decorative layer 76 may be at least partially light transmissible such that light emitted from one or more light sources 42 is not prevented from illuminating the viewable portion 16. The decorative layer 76 may also include opaque portions that may correspond with the opaque background region 28 of the badge 10.

With further reference to FIG. 5, a light diffuser 78 may be disposed between the viewable portion 16 and the light sources 42. For example, the light diffuser 78 may be a layer applied to the underside of the viewable portion 16. The diffuser 78 can be transparent or translucent and generally functions to diffuse the light from the light sources 42 so that unwanted hot spots and shadows are minimized. According to one embodiment, the inner surface and/or outer surface of the viewable portion 16 may be coated, roughened or receive micro-faceting to aid in the light diffusion performance. Additionally, or alternatively, the diffuser 78 may be applied to a portion of the decorative layer 76 in order to optimize the light diffusing effect. In alternate embodiments, the diffuser 78 may be applied to or disposed on some or all of the light sources 42 disposed within the badge 10.

Referring to FIGS. 6-8, a lighting sequence of the badge 10 is shown according to one embodiment. For purposes of illustration, the light sources 42 are visibly shown through the indicia 30 of the badge 10. The lighting sequence may begin by first activing light source 42a to illuminate a first portion, such as a central area 80 of the indicia 30, as shown in FIG. 6. Next, as shown in FIG. 7, alternate light sources 42 that correlate to the indicia 30, according to the illustrated embodiment, are illuminated at varying intensities. Next, as shown in FIG. 8, different light sources 42a, 42b, 42c, 42d, 42e may be illuminated at varying intensities for varying lengths of time concurrently and/or sequentially.

In operation, any number of light sources 42 disposed within the badge 10 are independently activated in a randomized manner such that the each independently illuminable light source 42 may illuminate and return to an unilluminated state at randomized times, for varying lengths of time, at varying intensities, and in a variation of colors. Thus, the randomized illumination of the light sources 42 may create a "sparkle" effect.

Figure 9:
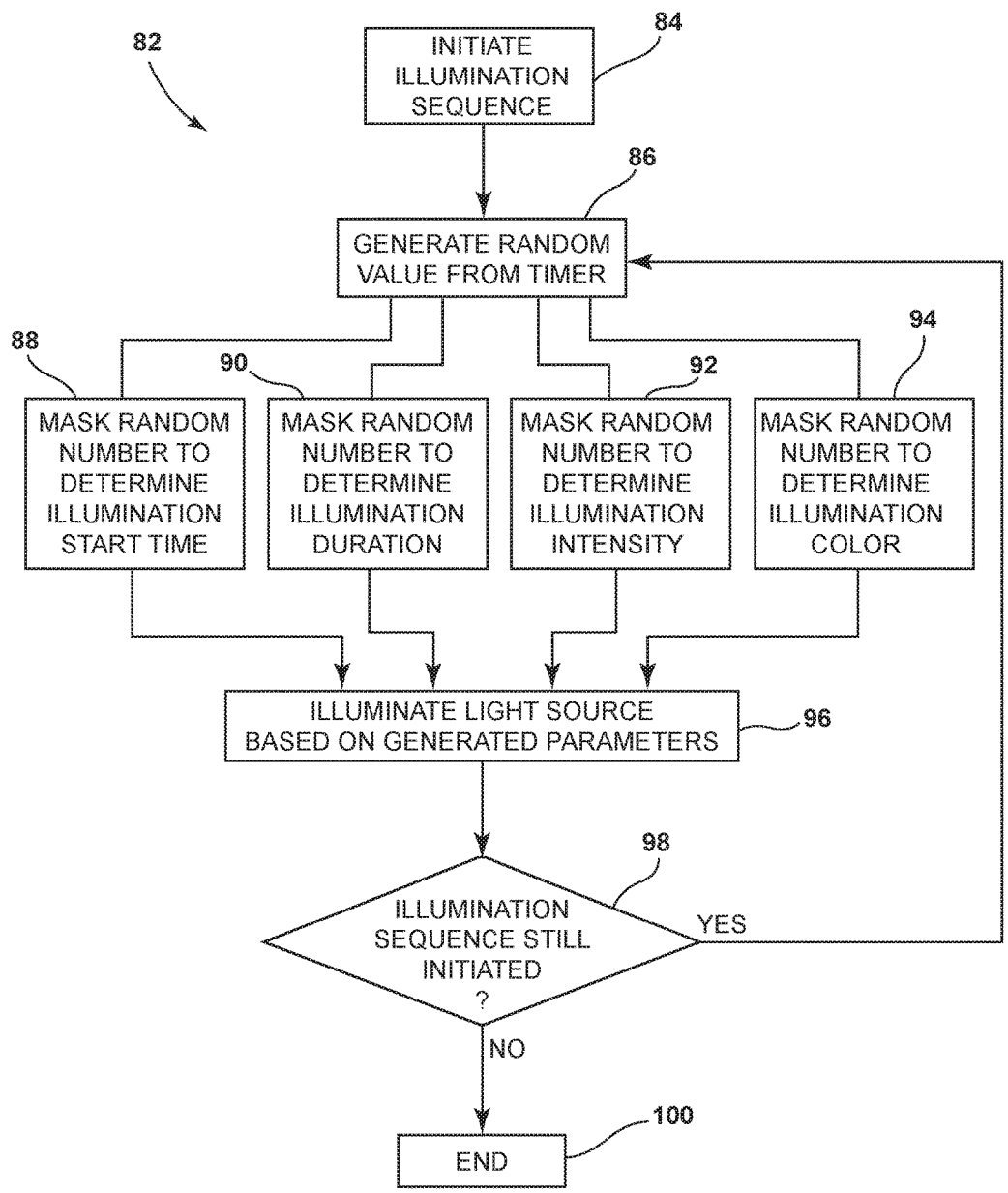
FIG. 9 is a flow diagram illustrating a method of illuminating that badge that includes randomizing one or more illumination parameters to generate a pseudo-random illumination sequence, according to one embodiment.
Figure 10:
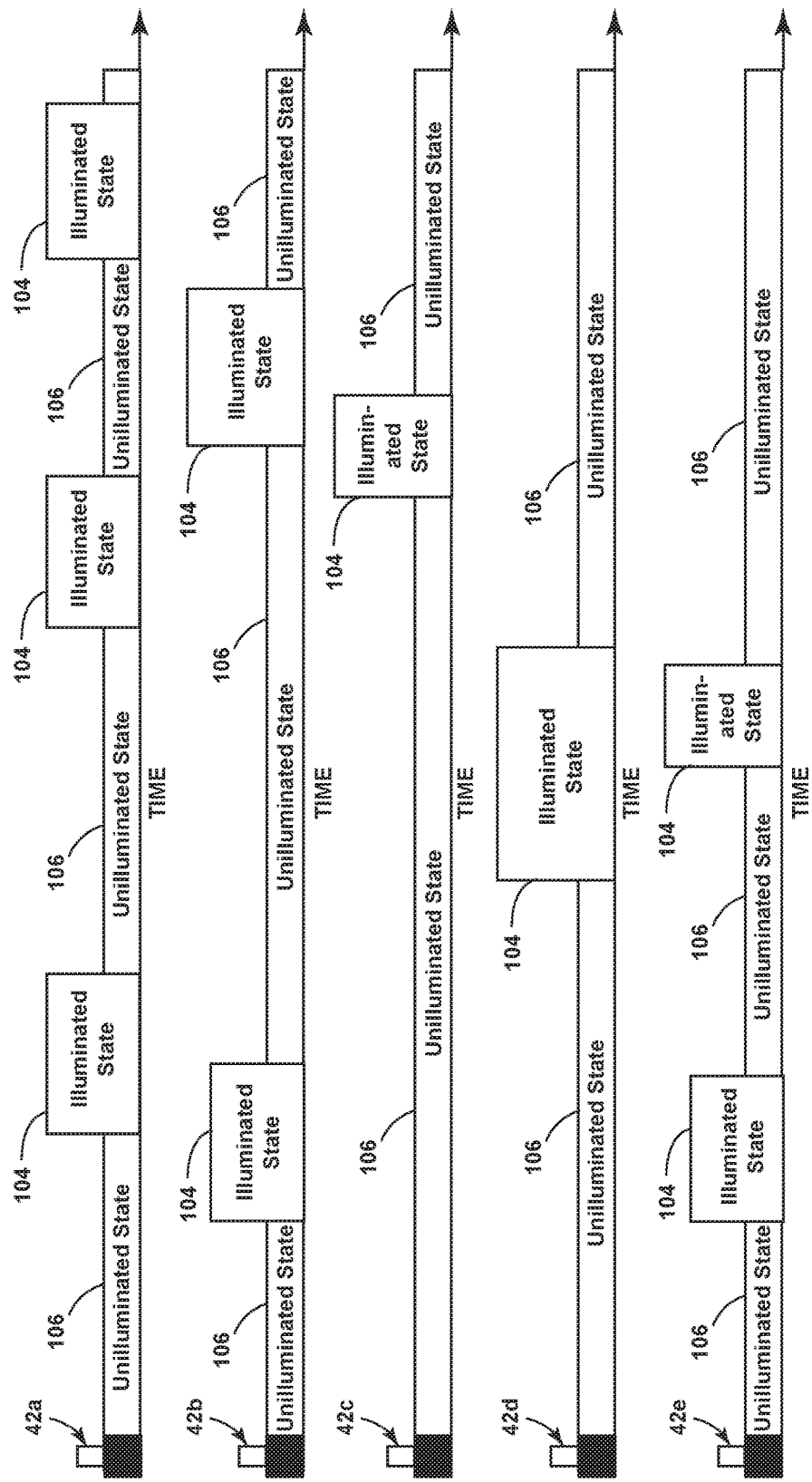
FIG. 10 illustrates an illumination sequence of five exemplary light sources, according to one embodiment, that illuminate at varying times, for varying periods of time, at varying intensities, and in varying colors.

Referring to FIGS. 9 and 10, a routine 82 for producing one or more independently illuminable light sources 42 having varying parameters is illustrated. The activation state of each respective light source 42, according to the embodiment of FIGS. 8 and 9, is controlled by its own routine 82 that is independently timed during the illuminated and the unilluminated states of each respective light source 42.

With reference to FIG. 9, an embodiment of the badge 10 is illustrated schematically in which the badge 10 is configured to generate randomized parameters for illumination of each light source 42. In step 84, the illumination sequence for generating a randomized illumination pattern is initiated. The illumination sequence may be initiated based on initiation of any predefined vehicular condition. For example, the illumination sequence may be initiated through a user interface 102 or through a light sensor. Alternatively, the illumination sequence may be initiated whenever a light disposed on the vehicle 14 is placed in an illuminated state. Alternatively still, the illumination sequence may be initiated whenever a vehicle lighting system is initiated or whenever an engine of the vehicle 14 is initiated.

In step 86, according to one embodiment, a random value may be generated from a sample taken from one or more of the clocks, counters, and/or timers disposed within the controller 46 that may be consistently running while the randomized illumination routine 82 is initiated on the badge 10. With a 16-bit counter, a pseudo-random base value may be generated that is between 0 and 65,535. This base value may then be scaled to a smaller range of values, if desired, as will be described in greater detail below.

The numbers by themselves are not random. The definition of randomness includes not only the characteristics of the numbers generated, but also the characteristics of the generator that produces the numbers. According to one embodiment, a hardware generator that generates numbers with the same characteristics of numbers generated by a random physical process. According to an alternate embodiment, a software based random number generated may be utilized. The important characteristics are the degree to which the numbers produced have a non-biased statistical distribution, are unpredictable, and statistically are generally irreproducible. However, in alternate embodiments, the random numbers may be reproducible based on reconstruction, or through the use of a predefined algorithm for determining an illumination sequence.

Having a non-biased statistical distribution means that all values have equal probability of occurring, regardless of the sample size. Almost all applications may utilize a good statistical distribution of their random numbers, and high-quality random number generators can usually meet this requirement. A generator that meets only the non-biased statistical distribution requirement is called a pseudo-random number generator. Unpredictability refers to the fact that the probability of correctly guessing the next bit of a sequence of bits should be exactly one-half, regardless of the values of the previous bits generated.

In order for a generator to be generally irreproducible, two of the same generators, given the same starting conditions, will produce different outputs. A hardware generator based on random physical processes can generate values that meet the irreproducibility condition.

According to one embodiment, an inexpensive, high-performance hardware random number generator would be to incorporate it within a microprocessor 50. The random number generator can utilize random physical process sources such as those discussed above, and would be relatively inexpensive, since it would be incorporated into an already existing semiconductor die.

The random number generators are shown as delivering 16-bit random numbers to a system bus in an integrated circuit such as a single-chip controller 46. The integrated circuit is driven by a system clock 56, not explicitly shown in the drawings, and requests random numbers by driving a read signal to the high (active) state at times controlled, for example, by a microcomputer application program.

The clock pulses may be gated by logic AND gates and counted by one or more counters. The counters may be eight-bit up-counters. The counter may include a read-out control circuit which outputs the counter contents only when a high signal is received at an output enable (OE) terminal, to which the read signal is connected. Accordingly, the OE terminal may mask some bits such that a pseudorandom number may be defined between any sample size. The output terminals may be connected to a 16-bit system bus which carries the outputs to other parts of the integrated circuit, such as memory 48 and controller circuits.

At steps 88, 90, 92, and 94, to reduce the cost of the controller 46, an alternative to floating math may be utilized to generate the desired parameters of illumination for each light source 42. According to one embodiment, a cheaper controller 46 may be utilized that instead of scaling the random base value, uses a bitwise operation that masks a predefined number of bits. In other words, the masked bits may be ignored such that only the unmasked bits are used to determine a random base value based on the unmasked bits. For the embodiment illustrated in FIG. 9, an eight-bit random base value is generated. It will be appreciated, however, that in alternate embodiments any number of bits may be used to generate any illumination parameters without departing from the teachings provided herein.

At step 88, a portion of the bits are masked to reduce the number of possible illumination initiating times. For example, some of the bits may be masked to generate a number between 0 and 15. Thus, each independently illuminable light source 42 may have 16 different lengths of unilluminated time between its illumination periods.

Likewise, at step 90, the random base value may be used for determining the illumination period length based on the bits that are not masked. At step 92, all eight bits may be utilized, with no masking, such that 256 intensity levels may be generated by each respective light source 42. Lastly, at step 94, an illumination color may also be determined based on the generated random number. The badge 10 may include any number of predefined colors that correlate to the same amount of numbers that may be generated by the processor 50.

Each of the parameter determinations made in steps 88, 90, 92, and/or 94 may be generated through comparing the random number to stored parameters within a look-up table (LUT). A counter is used as a pointer into the lookup table. According to one embodiment, at least one selection circuit is configured to select a predefined output from the corresponding lookup table according to bits in the random base value.

At step 96, the processor 50 compiles each of the randomly determined parameters and illuminates the respective light source 42 based on the compiled parameters. Once the illumination period for the respective light source 42 ceases, at step 98, a new random value is generated for the light source 42 and a new illumination pattern is determined. This process may be repeated until the illumination sequence ends at step 100.

Referring to FIG. 10, the illumination sequences of five independently illuminable light sources 42a, 42b, 42c, 42d, 42e are schematically illustrated. For illustrative purposes, the illumination states of each light source 42a, 42b, 42c, 42d, 42e are shown as rectangles 104 of varying sizes. The length of each illuminated state rectangle exemplifies the illumination period of each light source 42a, 42b, 42c, 42d, 42e. The height of each illuminated state rectangle exemplifies the intensity of light emitted from the light source 42a, 42b, 42c, 42d, 42e. Unilluminated state rectangles 106 are disposed between each of the illuminated state rectangles 104 and illustrate time periods in which each respective light source 42a, 42b, 42c, 42d, 42e is in an unilluminated state. Moreover, as described above, the light sources 42 may each illuminate in a wide range of randomly generated colors in some embodiments.

Figure 11:
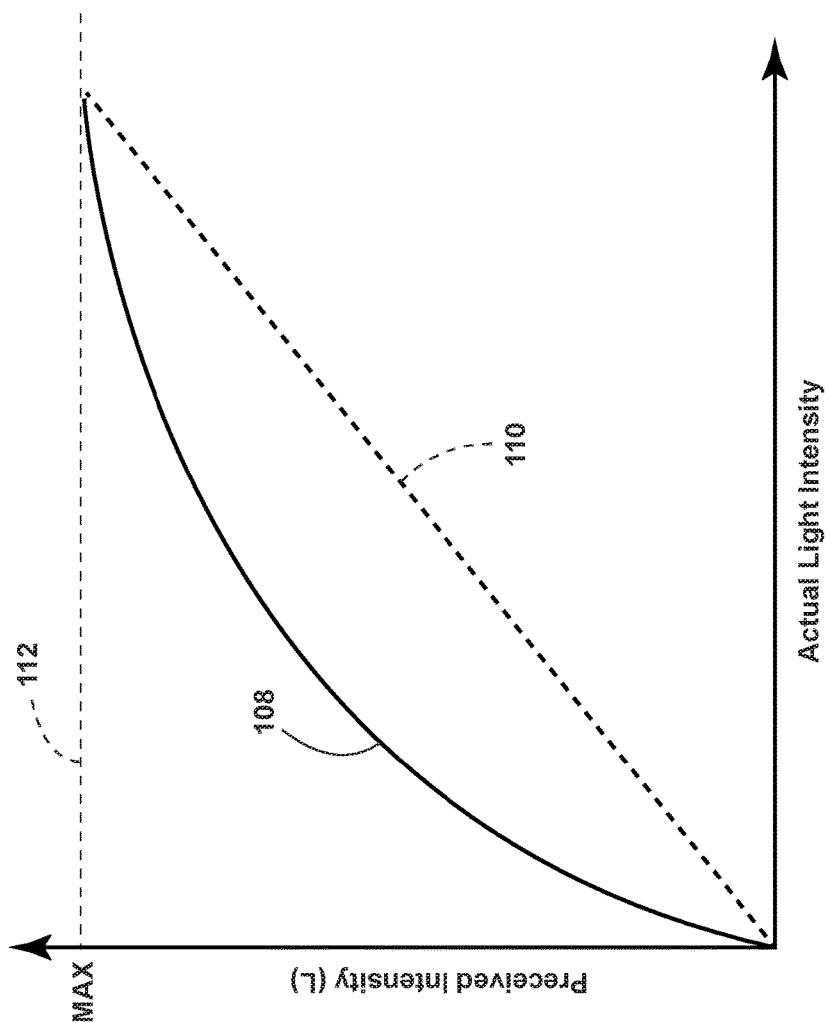
FIG. 11 is a graph illustrating a perceived light intensity and actual light intensity, according to one embodiment.
Figure 12:
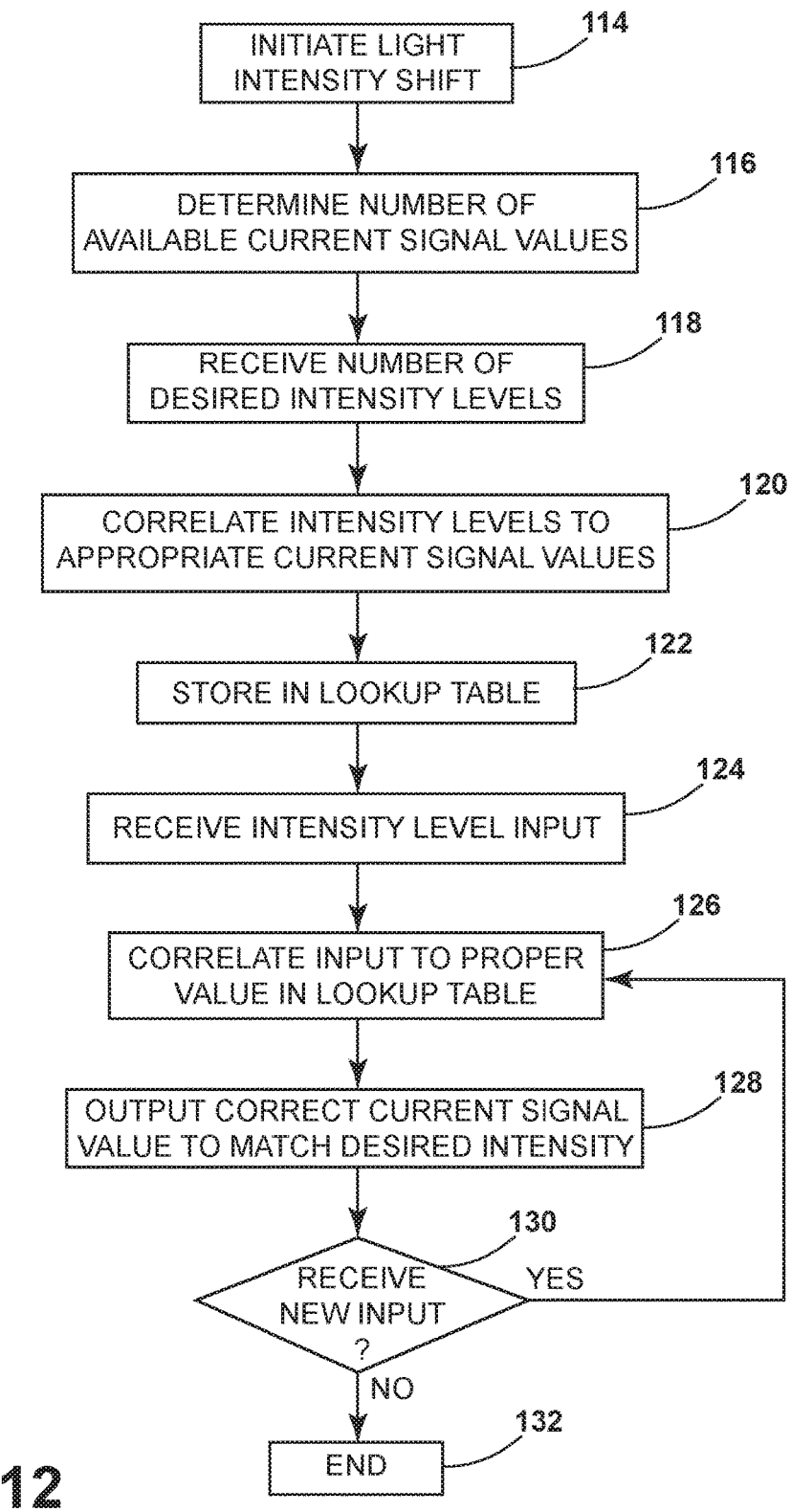
FIG. 12 is a flow diagram illustrating a method of illuminating that badge that includes randomizing one or more illumination parameters to generate a pseudo-random illumination sequence, according to one embodiment.

Referring to FIGS. 11 and 12, a human eye responds to decreases in the measured light percentage by automatically enlarging the pupil to allow more light to enter the eye. Allowing more light to enter the eye may result in the perception that the light is actually brighter. Thus, the light perceived by the human may be greater than the measured light. For example, the curve 108 in FIG. 11 illustrates the perceived intensity (L) of the emitted light while the line 110 illustrates the outputted light intensity. In one embodiment, measured light and perceived light percentages do not completely converge until measured light is approximately 100% ($L_{max}$ 112). Because of the non-linear relationship between measured light intensity and perceived light intensity (L), the illumination of the badge 10 may appear to have a small electric current signal value range, which may be defined as the full range of current output levels of the controller 54. Thus, according to one embodiment, the intensity of the emitted light may be mapped to a lookup table that substantially matches the perceived light intensity (L). Accordingly, an increase in light intensity from 0% to 100% inputted current would appear linear, rather than logarithmic.

With reference to FIG. 12, one embodiment of the badge 10 is illustrated schematically in which the badge 10 is configured to convert a desired light intensity L to an input current $I_p$ through pulse width modulation, direct current control, or through any other means known in the art that generates a desired perceived linear response. It will be understood that the due to Ohm's law, the voltage levels may alternatively be controlled without departing from the teachings provided herein.

At step 114, the system is initiated. At step 116, a determination of a maximum amount of electric current signal values that may be output by the implemented controller 46 is calculated. For example, an eight-bit controller 46 may include 256 electric current signal values. At step 118, to reduce the cost of the controller 46 necessary to control the badge 10, a desired number of intensity levels that is less than the maximum electric current signal values is inputted. As will be described in greater detail below, the intensity levels correlate to the maximum electric current signal values such that a perceived increase in light intensity emitted from the light source 42 appears linear along the full range of available electric current signal values.

At step 120, according to one embodiment, a function is utilized to correlate the desired number of intensity levels to corresponding electric current signal values that may be utilized to form a perceived linear increase and/or decrease in emitted light intensity as the intensity is increased and/or decreased from a first electric current signal value to a subsequent electric current signal value. The conversion of a desired light intensity L to an input current $I_p$ that generates a desired perceived linear response is defined by the following relationship:

$$I_p = \left(\sqrt[3]{kL}\right)^3$$

where k is equal to a scaling coefficient that is determined by the number of desired parameters stored within the lookup table. Thus, for an eight bit pulse-width modulation controller 46 (creating 255 intensity outputs, plus an unilluminated state) having 40 desired intensity levels, the scaling coefficient k would equal:

$$k = \frac{\left(\sqrt[3]{I_p}\right)^2}{L} = \frac{\left(\sqrt[3]{255}\right)^2}{40} = 1.0053$$

The relationship shown above may then used to create a lookup table defining the predefined electric current signal values, according to one embodiment. To determine each electric current signal value to be stored in the lookup table, a desired number of intensity levels is defined. For example, 40 levels may be desired to correlate to the 256 available electric current signal values.

At step 122, each integer from 0 to 40 is entered individually into the relationship above and the resulting electric current signal value is stored in the memory 48 as the electric current signal value for the respective desired intensity level. The desired intensity levels and corresponding electric current signal values may be stored as a lookup table such that the forty desired intensity levels are equal to the eight bit values provided in the lookup table. Thus, the 40 outputted values that would linearly map to the 255 intensity outputs would equal {0, 1, 3, 5, 8, 11, 15, 19, 23, 27, 32, 37, 42, 47, 53, 59, 64, 71, 77, 83, 90, 97, 104, 111, 118, 126, 134, 141, 149, 157, 166, 174, 182, 191, 200, 209, 218, 227, 236, 245, 255}.

According to an alternate embodiment, the conversion of a desired light intensity L to an input current $I_p$ that generates a desired perceived linear response may be defined by the following relationship:

$$I_p = e^{kL} - 1$$

where k is equal to a scaling coefficient that is determined by the number of desired parameters stored within the lookup table and e is Euler's number, which is a numerical constant that is equal to 2.71828. Thus, for an eight bit pulse-width modulation (creating 255 intensity outputs, plus an unilluminated state) having 40 desired intensity levels, the scaling coefficient k would equal:

$$k = \frac{\ln(255)}{40} = 0.1386$$

The relationship shown above may then used to create a lookup table defining the predefined electric current signal values, according to one embodiment. To determine each electric current signal value to be stored in the lookup table, a desired number of intensity levels is defined. For example, 40 intensity levels may be desired to correlate to the 256 available electric current signal values.

It will be appreciated that any other function may be used to determine a desired electric current signal value to be output from the light source 42. According to one embodiment, a processing algorithm may be utilized such that lookup tables need not be used. According to an alternate embodiment, processing algorithms that do not utilize lookup tables may be used in conjunction with other lighting parameters that may use lookup tables.

At step 122, each integer from 0 to 40 is entered individually into the relationship above and the resulting electric current signal value is stored in the memory 48 as the electric current signal value for the respective desired intensity level. The desired intensity levels and corresponding electric current signal values may be stored as a lookup table such that the forty desired intensity levels are equal to the eight bit values provided in the lookup table. Accordingly, the 40 outputted values that would map to the current intensity outputs would equal {0, 0, 0, 1, 1, 1, 1, 2, 2, 2, 3, 4, 4, 5, 6, 7, 8, 10, 11, 13, 15, 17, 20, 23, 27, 31, 36, 41, 48, 55, 63, 73, 83, 96, 110, 127, 146, 168, 193, 222, 255}.

At step 124, the controller 46 receives an inputted desired intensity level. The input may be received through a process running on any processor 50 and/or controller 46 disposed on the badge 10 and/or the vehicle 14, such as the illumination pattern described in reference to FIGS. 6-8, or may be inputted through a user interface 102 by an occupant of the vehicle 14. The inputted desired intensity level is chosen from the predefined intensity levels.

At step 126, the inputted intensity level is correlated to an electric current signal value through the usage of the values stored within the lookup table. At step 128, the controller 46 outputs the defined electric current signal value to cause the light source 42 to emit a desired light intensity. At step 130, the badge 10 monitors for the receival of a new input. If a new input is received, a perceived linear increase or decrease in light intensity may be outputted from the light source 42. Because the human eye responds to small variations in light intensity at low levels, the light intensity may increase at a slower rate at lower intensities than when illuminating the light source 42 at a higher desired intensity. It will be appreciated that the implementation of a mapping function and the desired number of defined intensities levels are both matters of design choice. The defined intensity levels can be predetermined and embodied in the memory 48 of the controller 46. The memory 48 can store the defined intensity levels in one or more lookup table(s). For each defined intensity level, the lookup table can include one or more corresponding electric current signal values. It will be understood that any function, equation, process, and/or method may be used for mapping any number of electric current signal values to any number of desired intensity levels without departing from the teachings provided herein.

At step 132, if the controller 46 does not receive a new input to change the intensity of light emitted from the light source 42, the badge 10 ends the conversion process. Accordingly, once the conversion process is ended, the light source 42 may continue emitting light at the desired intensity or return to an unilluminated state. Once a new input is received, the process can begin again at step 114 or at step 126.

Figure 13:
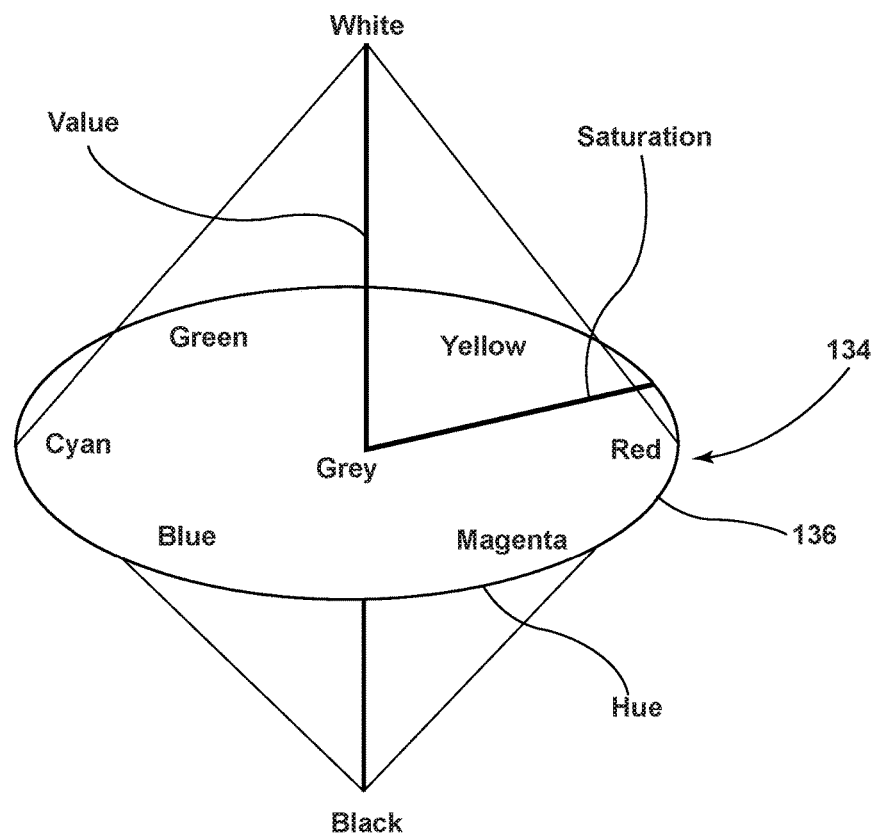
FIG. 13 is a schematic representation of HSV color space.
Figure 14:
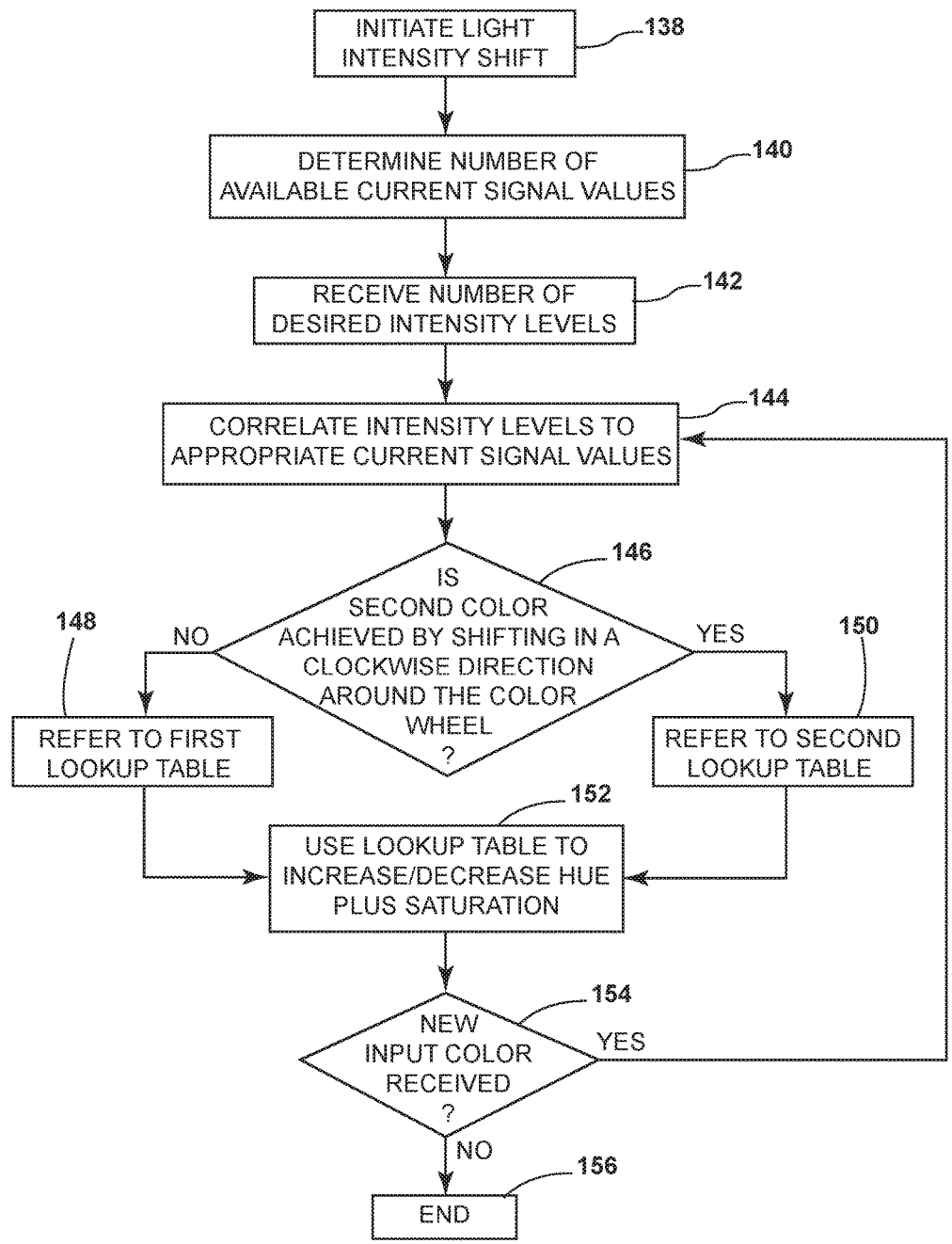
FIG. 14 is a flow diagram illustrating a method of shifting the illumination color of a light source disposed on the badge from a first color to a second color, according to one embodiment.

Referring to FIGS. 13 and 14, in addition to, or alternatively to, the perceptive linear intensity modification described above, the controller 46 may be configured to linearly adjust between varying color hues emitted from the light source 42 through a color mapping method that may imitate the physical nature of light.

As illustrated in FIG. 13, the RGB color space 134 is a hardware-oriented scheme that may be utilized by multicolored light sources 42. In the RGB color space 134, the three primary colors of red, green, and blue are distributed along a ring 136 and are separated from each other by 120 degrees, the secondary colors lie in-between the primary colors, and the solid ring 136 of colors spanning all of the spaces between the primaries is created. The solid ring 136, which holds the hue coordinate, indicates the color as described by wavelength. The radius of the ring, which holds the saturation coordinate, indicates the amount of color that is present. A conversion to a hue, saturation, and value (HSV) color model may be shown by a line normal to the hue-saturation plane holds the value (e.g., intensity) coordinate and indicates the amount of light that is present.

The HSV model closely resembles human perception of color and its components are similar to the artist's concept of tint, shade, and tone. The space in which these values are plotted can be shown by a pair of circular cones, as shown in FIG. 13. Moreover, the 3D representation of the HSV model is derived from the RGB model cube as is known in the art. However, the conversion from HSV to RGB is difficult to efficiently implement in a low-range embedded processor 50, especially if there are multiple independently controlled light sources 42 concurrently emitting light at various times, for various time periods, at varying intensities, and/or in various colors.

Referring to FIG. 14, one embodiment of the badge 10 is illustrated schematically in which the badge 10 is configured to efficiently shift a first color hue of light emitted from a light source 42 to a second desired color hue. At step 138, the color shift sequence is initiated. As described above, the illumination sequence may be initiated through a user interface 102 or through a light sensor. Alternatively, the illumination sequence may be initiated whenever a light disposed on the exterior portion of the vehicle 14 is placed in an illuminated state. Alternatively still, the illumination sequence may be initiated whenever a vehicle lighting system is initiated or whenever an engine of the vehicle 14 is initiated.

At step 140, the main hues are defined. According to one embodiment, the main hues include red, which can be expressed in the RGB color space as 1, 0, 0; yellow, which can be expressed in the RGB color space as 1, 1, 0; green, which can be expressed in the RGB color space as 0, 1, 0; cyan, which can be expressed in the RGB color space as 0, 1, 1; blue, which can be expressed in the RGB color space as 0, 0, 1; and purple, which can be expressed in the RGB color space as 1, 0, 1. However, in alternate embodiments any color model and/or any color hues may be utilized without departing from the teachings provided herein. For example, a cubic CMYK color model may be used in conjunction with or instead of the RGB color model described herein.

At step 142, a range of intensity levels of each color output from the light source 42 is defined. According to one embodiment, the range may correlate to the same number of light intensity levels described above if both methods are used in conjunction with one another. However, it will be appreciated that the range of intensity levels of each color output from the light source 42 may correspond to any practicable range that may be provided by the controller 46 configured to control the lighting operations of the badge 10. A pair of lookup tables having inverse shifting patterns from the first color hue to the second hue are defined by the number of desired intensity levels of each color output from the light source 42. According to one embodiment, 40 independent intensity levels may be utilized.

At step 144, an input is received that includes a desired second color hue. At step 146, the controller 46 determines whether the color shift from the first color hue to the second color hue is achieved by shifting the color in a clockwise direction in the color wheel of FIG. 13, like for example shifting from red to purple. If so, the method continues to step 148, where a first lookup table is utilized. The first lookup table may include values for shifting the first color hue from red to purple. To accomplish this color shift, a plurality of color shifts may progressively or concurrently occur. To shift from red to yellow, green is increased from an intensity level of 0 towards 40. To shift from yellow to green, red is decreased from an intensity level of 40 towards 0. To shift from green to cyan, blue is increased from an intensity level of 0 towards 40. To shift from cyan to blue, green is decreased from an intensity level of 40 towards 0. To shift from blue to purple, red is increased from an intensity level of 0 towards 40. To shift from purple to red, blue is decreased from an intensity level of 40 towards 0.

If the color shift is not achieved by shifting the color in a clockwise direction, but in a counterclockwise direction, like for example shifting from purple to red, a second lookup table is utilized at step 150. The second lookup table may include values for shifting the first color hue from purple to red. To accomplish this color shift, a plurality of color shifts may progressively or concurrently occur. To shift from purple, which is formed from a combination of red and blue both having an intensity level greater than 0, to red, red is decreased from an intensity level of 40 towards 0. To shift from blue to cyan, green is increased from an intensity level of 0 towards 40. To shift from cyan to green, blue is decreased from an intensity level of 40 towards 0. To shift from green to yellow, red is increased from an intensity level of 0 towards 40. To shift from yellow to red, green is decreased from an intensity level of 40 towards 0.

At step 152, the first or second lookup table is utilized for emitting the second color hue from the light source 42. Shifting from the first color hue to the second color hues may be accomplished by using the 40 mapped intensity levels that correlate to a linear perception of increases and decreases in emitted light intensity, as described above in reference to FIGS. 11 and 12.

The shifting from the first color hue top the second color hue is accomplished in a linear manner, as described above. The lookup table may be utilized to determine which of the RGB color hues to increase or decrease to accomplish a desired color. The linear movement occurs until the color hue reaches the end of the intensity ranges, which in regards to the above noted example, would be an intensity level of 40. The color value may also be concurrently and linearly adjusted with the hue. In some embodiments, the color values may be stored in a separate table that includes an independent range of intensity levels. For example, the color value lookup table may range from 0 to 5 and may be adjustable based on a linear perception, as described herein.

At step 154, the badge 10 monitors for the receival of a new input. If a new input is not received, a current light color may be continually emitted from the light source 42, the light source 42 may return to an unilluminated state, or the light source 42 may perform any other function. At step 156, the method ends.

Figure 15:
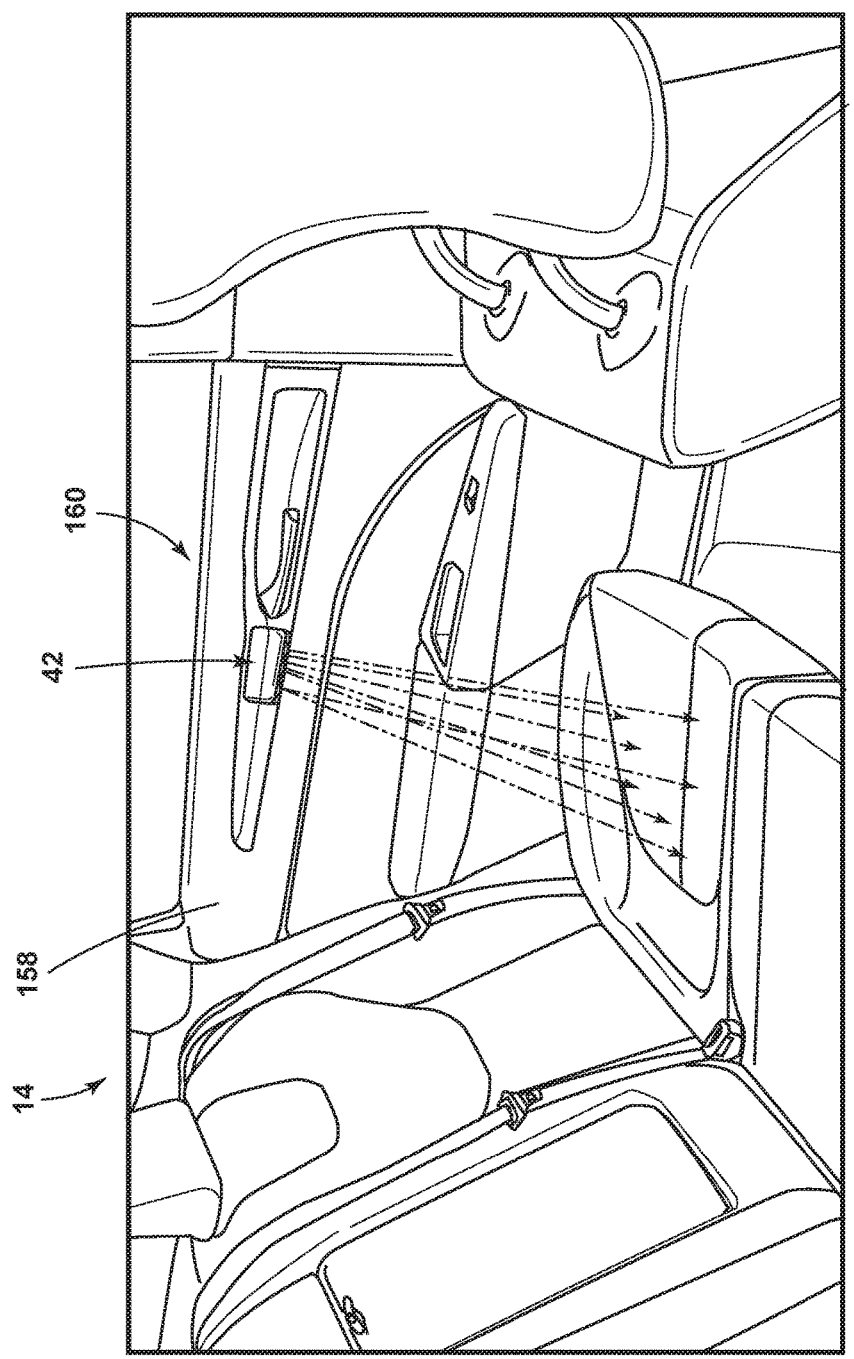
FIG. 15 is a perspective of a vehicle interior showing a trim component therein having a light source that functions in conjunction with the illumination sequences described herein.

Referring to FIG. 15, an illuminated trim component 158 disposed within a cabin 160 of the vehicle 14 is illustrated. The trim component 158 may include one or more light source(s) 42 therein that function in conjunction with the illumination patterns described herein. For example, any light source 42 within the trim component 158 may illuminate at various times, for various time periods, at varying intensities, and/or in various colors. It will be appreciated that any illuminated component 158 disposed within the vehicle 14 may incorporate any of the features and/or illumination sequences provided herein without departing from the scope of the present disclosure.

It is important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle badge comprising:
    a plurality of light sources each configured to illuminate in a non-biased statistically distributed pseudorandom sequence between first and second subsequent illumination sequences; and
    a controller operably coupled with the plurality of light sources and having a counter therein, the counter determining the subsequent illumination sequence while the first illumination sequence occurs based on a parameter defined by a base value that is generated from a sample taken from the counter.

2. The vehicle badge of claim 1, wherein the plurality of light sources are disposed between a housing and a substrate.

3. The vehicle badge of claim 2, further comprising:
    a decorative layer disposed between an exterior surface of the housing and the plurality of light sources.

4. The vehicle badge of claim 1, wherein an activation state of the plurality of light sources is each independently controlled by a unique routine.

5. The vehicle badge of claim 1, wherein the base value is compared to a predefined value in a lookup table, wherein an illumination parameter is output to the light source based on the predefined value of the lookup table.

6. The vehicle badge of claim 5, wherein one or more bits of the counter are masked to limit the number of illumination parameters.

7. The vehicle badge of claim 5, wherein an illumination start time of the plurality of light sources is the illumination parameter.

8. The vehicle badge of claim 5, wherein an illumination duration of the plurality of light sources is the illumination parameter.

9. The vehicle badge of claim 5, wherein an illumination color of the plurality of light sources is the illumination parameter.

10. The vehicle badge of claim 1, wherein the plurality of light sources are aligned and form a similar geometry with indicia defined within a housing disposed forwardly of the plurality of light sources.

11. A vehicle badge comprising:
    a plurality of light sources each configured to illuminate in a non-biased statistically distributed pseudorandom sequence in a first illumination sequence and a second, subsequent illumination sequence; and
    a controller operably coupled with the plurality of light sources and having a counter therein, wherein the counter determines the subsequent illumination sequence and additional sequences are flashed to the controller once said vehicle badge is attached to a vehicle.

12. A vehicle badge comprising:
    a plurality of light sources each configured to illuminate in a non-biased statistically distributed pseudorandom sequence in a first illumination sequence and a subsequent second illumination, wherein each non-illuminated light source in the first illumination sequence has a generally equal probability to become illuminated in the second illumination sequence; and
    a controller operably coupled with the plurality of light sources and having a counter configured to determine the subsequent illumination sequence.

* * * * *